US011218094B2

(12) United States Patent
Mueller

(10) Patent No.: US 11,218,094 B2
(45) Date of Patent: Jan. 4, 2022

(54) METHOD FOR OPERATING AN ELECTRONICALLY COMMUTATED ELECTRIC MOTOR

(71) Applicant: Robert Bosch GmbH, Stuttgart (DE)

(72) Inventor: Tankred Mueller, Hamburg (DE)

(73) Assignee: Robert Bosch GmbH, Stuttgart (DE)

( * ) Notice: Subject to any disclaimer, the term of this patent is extended or adjusted under 35 U.S.C. 154(b) by 45 days.

(21) Appl. No.: 16/641,321

(22) PCT Filed: Aug. 8, 2018

(86) PCT No.: PCT/EP2018/071496
§ 371 (c)(1),
(2) Date: Feb. 24, 2020

(87) PCT Pub. No.: WO2019/038086
PCT Pub. Date: Feb. 28, 2019

(65) Prior Publication Data
US 2020/0389104 A1 Dec. 10, 2020

(30) Foreign Application Priority Data
Aug. 22, 2017 (DE) .................... 10 2017 214 637.0

(51) Int. Cl.
*H02P 6/15* (2016.01)
*H02P 25/03* (2016.01)

(52) U.S. Cl.
CPC .............. *H02P 6/153* (2016.02); *H02P 25/03* (2016.02)

(58) Field of Classification Search
CPC ................................ H02P 6/153; H02P 6/183
See application file for complete search history.

(56) References Cited

U.S. PATENT DOCUMENTS

| 6,972,539 | B1 | 12/2005 | Codilian et al. |
| 7,034,497 | B2* | 4/2006 | Markunas ............... H02P 6/185 318/400.33 |
| 7,511,439 | B2* | 3/2009 | Bosch ..................... H02P 6/182 318/254.1 |

(Continued)

FOREIGN PATENT DOCUMENTS

| DE | 19882041 | 1/2000 |
| DE | 10326606 | 1/2005 |

(Continued)

OTHER PUBLICATIONS

International Search Report for Application No. PCT/EP2018/071496 dated Oct. 18, 2018 (English Translation, 2 pages).

*Primary Examiner* — Rina I Duda
(74) *Attorney, Agent, or Firm* — Michael Best & Friedrich LLP

(57) ABSTRACT

The invention relates to a method for operating an electronically commutated electric motor (10), in which method, during ongoing operation of the electric motor (10), in order to achieve an optimal operating point of the electric motor (10), a pre-commutation angle (14) provided by a control device (12) is regulated. According to the invention, during an operation of the electric motor (10), a period signal (16) is modulated to the pre-commutation angle (14) and a state parameter (18) of the electric motor (10) correlating with an efficiency of the electric motor (10) is detected.

6 Claims, 1 Drawing Sheet

(56) References Cited

U.S. PATENT DOCUMENTS

2009/0128074 A1* 5/2009 Hu ........................... H02P 6/21
                                                       318/400.33
2011/0241582 A1* 10/2011 Maier ...................... H02P 6/17
                                                       318/400.04

FOREIGN PATENT DOCUMENTS

DE      10346711      5/2005
GB       2339349      1/2000

* cited by examiner

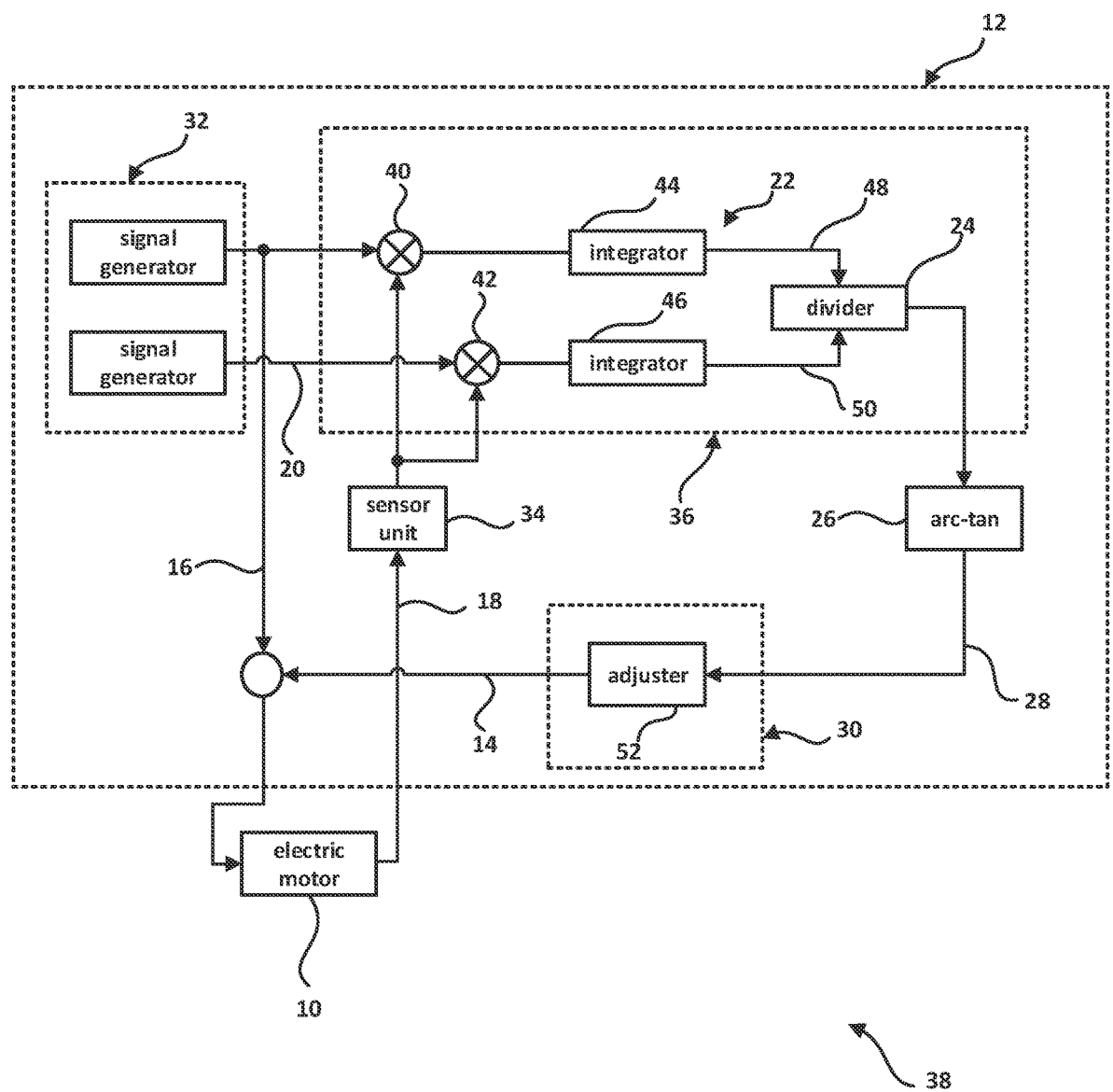

METHOD FOR OPERATING AN ELECTRONICALLY COMMUTATED ELECTRIC MOTOR

BACKGROUND OF THE INVENTION

A method for operating an electronically commutated electric motor in which a pre-commutation angle which is made available by an adjuster is adjusted during ongoing operation of the electric motor in order to achieve an optimum operating point of the electric motor has already been proposed.

SUMMARY OF THE INVENTION

The invention is based on a method for operating an electronically commutated electric motor in which during ongoing operation of the electric motor a pre-commutation angle which is made available by an adjuster is adjusted in order to achieve an optimum operating point of the electric motor.

It is proposed that during operation of the electric motor a periodic, preferably harmonic, signal is modulated onto the pre-commutation angle, and a state characteristic variable of the electric motor, which correlates with an efficiency level of the electric motor, in particular a current signal of a current consumption level of the electric motor, is acquired.

The electric motor is embodied, in particular, as a brushless direct current motor. In particular, the electric motor is provided for generating a rotating movement, wherein a preferably permanently excited and/or externally excited rotor of the electric motor is rotatably mounted relative to a stator of the electric motor, which has, in particular, a multiplicity of winding phases. The electric motor can be embodied, in particular, as an external rotor motor or as an internal rotor motor. The electric motor can be, in particular, a three-phase electric motor, but more phases, for example five or seven, are also conceivable.

For optimum operation of the electric motor it is, in particular, necessary that an, in particular, minimum possible current is set in the electric motor. For this purpose, the internal voltages of the electric motor and the associated motor fundamental wave current should be in phase. For this purpose, in particular owing to the inductance of the electric motor actuation of the phase is necessary in a way which is brought forward chronologically. This correction, which compensates the lagging behavior of the motor fundamental wave current is described by the so-called pre-commutation angle. An ideal pre-commutation angle brings about an optimum efficiency level of the electric motor. Under certain conditions, it may be indispensable to adjust the pre-commutation angle, for example if the electric motor is operated at a voltage design limit at a maximum temperature and/or maximum current level, owing to loading and as a result of dimensioning of the motor.

In order to adjust the pre-commutation angle, the electric motor is equipped with an additional adjustment device. The adjustment device is provided to bring the electric motor to an optimum operating point through subsequent adjustment of the pre-commutation angle. The term "provided" is to be understood in particular as meaning specifically programmed, configured and/or equipped. The fact that an object is provided for a specific function is to be understood as meaning, in particular, that the object performs and/or executes the specific function in at least one application state and/or operating state.

In order to determine a pre-commutation angle which is adapted to a current operating state of the electric motor, in a method step during operation of the electric motor a periodic, preferably harmonic, signal, in particular a harmonic signal with a small amplitude, is modulated onto the current pre-commutation angle. A frequency of the periodic signal is to be adapted to a transient recovery time of the electric motor. A signal with a period length of, for example, 10 seconds is sufficient to compensate for relatively slow thermal processes. In addition, a state characteristic variable of the electric motor which is correlated with an efficiency level of the electric motor is acquired. A current signal of a current consumption level of the electric motor is preferably acquired. Instead of measuring the overall current, other variables, for example an average current consumption level of the electric motor, is also conceivable. The measurement of the current is preferably carried out with >10 measuring points per period of the periodic signal which is modulated on. As a result, a dimensionally accurate signal reconstruction can be achieved.

In a further course of the method, a pre-commutation angle which is adapted to a current operating state of the electric motor is determined from a correlation between the periodic signal and a variation of the state characteristic variable. In a method step the acquired state characteristic variable is preferably multiplied by the periodic signal and the periodic signal which is phase-shifted through 90°. In a further method step, integration of the products of the multiplications of the state characteristic variable by the periodic signal and the periodic signal which is phase-shifted through 90° is carried out. In addition, in a further method step the integration results are divided and the arc-tangent function of the quotient is calculated. In a further method step, the calculated angle is used as a pre-commutation angle which is adapted to a current operating state of the electric motor. The angle which is determined by means of the method can be used immediately as an adjustment signal for the electric motor.

By means of such a method it is possible to achieve advantageously simple adjustment of the pre-commutation angle and therefore advantageously efficient operation of an electric motor. In addition, the drive behavior of the electric motor can be advantageously adapted to a real implementation of the electric motor. In addition, by means of the adjustment during ongoing operation, the pre-commutation angle can be advantageously adapted to heating of the electric motor. In addition, changes of components of the electric motor as a result of wear and/or ageing can be advantageously compensated. Dimensioning margins in the design can be advantageously dispensed with.

Furthermore, an adjustment device for carrying out the method according to the invention is proposed, having at least one adjustment unit which is provided for adjusting a pre-commutation angle during ongoing operation of an electronically commutated electric motor in order to achieve an optimum operating point of the electric motor.

It is proposed that the adjustment device has at least one signal generator unit for modulating a periodic, preferably harmonic, signal onto the pre-commutation angle during the operation of the electric motor. In particular, the signal generator unit is provided to generate and/or output a harmonic signal, in particular a harmonic signal with a small amplitude, and to modulate it onto the current pre-commutation angle. A frequency of the periodic signal is to be adapted to a transient recovery time of the electric motor. A signal with a period length of, for example, 10 seconds is sufficient to compensate for relatively slow thermal processes of the electric motor. Furthermore it is proposed that the adjustment device has at least one sensor unit which is provided to acquire a state characteristic variable of the electric motor which correlates with an efficiency level of the electric motor, preferably a current signal of a current consumption level of the electric motor. The state characteristic variable is preferably acquired with >10 measuring points per period of the periodic signal which is modulated on. As a result, a dimensionally accurate signal reconstruction can be achieved. By means of such an adjustment device, advantageously simple adjustment of the pre-commutation angle and therefore advantageously efficient operation of an electric motor can be achieved.

In addition it is proposed that the adjustment device has a computing unit which is provided to determine, from a correlation between the periodic signal and a variation of the state characteristic variable, a pre-commutation angle which is adapted to a current operating state of the electric motor. The term "computing unit" is to be understood as meaning, in particular, a unit with an information input, an information processing means and an information output. The computing unit preferably has at least one processor, a memory, input and output means, further electrical components, an operating program, closed-loop control routines, open-loop control routines and/or calculation routines. The computing unit is provided, in particular, to multiply the acquired state characteristic variable by the periodic signal and the periodic signal which is phase-shifted through 90°. In addition, the computing unit is provided to integrate the products of the multiplications of the state characteristic variable with the periodic signal and the periodic signal which is phase-shifted through 90°. In addition, the computing unit is provided to carry out division of the integration results and to calculate the arc-tangent function of the quotient. The angle which is calculated in this way can advantageously be used as a pre-commutation angle which is adapted to a current operating state of the electric motor.

In addition, a drive system with at least one electronically commutated electric motor and at least one adjustment device according to the invention is proposed.

The method according to the invention and the adjustment device according to the invention are not intended to be restricted here to the application and embodiment described above. In particular, the method according to the invention and/or the adjustment device according to the invention, for performing a method of functioning described herein, can have a number of individual elements, components, units and/or method steps which differs from a number thereof which is specified here.

BRIEF DESCRIPTION OF THE DRAWINGS

Further advantages result from the following description of the drawing. The drawing illustrates an exemplary embodiment of the invention. The drawing, the description and the claims contain numerous features in combination. The person skilled in the art will expediently also consider the features individually and form appropriate further combinations.

In the drawing:

FIG. 1 shows a block circuit diagram of a drive system with an electronically commutated electric motor and an adjustment device.

DETAILED DESCRIPTION

FIG. 1 shows a block circuit diagram of a drive system 38. The drive system 38 comprises an electronically commutated electric motor 10 and an adjustment device 12 for adjusting the electric motor 10 in order to achieve an optimum operating point of the electric motor 10. The adjustment device 12 has an adjustment unit 30 which is provided to adjust a pre-commutation angle 14 during ongoing operation of the electronic commutated electric motor 10 in order to achieve an optimum operating point of the electric motor 10. In particular, the electric motor 10 is provided to generate a rotating movement, wherein a preferably permanently excited and/or externally excited rotor of the electric motor 10 is rotatably mounted relative to a stator of the electric motor 10 which has, in particular, a multiplicity of winding phases. The electric motor 10 can be embodied, in particular, as an external rotor motor or as an internal rotor motor. The electric motor can be, in particular, a three-phase electric motor 10, but more phases, for example five or seven, are also conceivable.

The adjustment device 12 has a signal generator unit 32 which is provided for generating a periodic, preferably harmonic, signal 16, in particular a sine signal, during the operation of the electric motor 10 and to modulate it onto the pre-commutation angle 14. In particular the signal generator unit 32 is provided to generate and/or output a harmonic signal 16 with small amplitudes and to modulate it onto the current pre-commutation angle 14. A frequency of the periodic signal 16 is adapted, in particular, to a transient recovery time of the electric motor 10. A harmonic signal 16 with a period length of, for example, 10 seconds is sufficient to compensate for relatively slow thermal processes of the electric motor 10.

In addition, the signal generator unit 32 is provided to output the periodic signal 20, which is phase-shifted through 90°, in parallel with the periodic signal 16. In addition, the adjustment device 12 has a sensor unit 34 which is provided to acquire a state characteristic variable 18 of the electric motor 10 which correlates with an efficiency level of the electric motor 10, preferably a current signal of a current consumption level of the electric motor 10. The state characteristic variable 18 is acquired by the sensor unit 34 preferably with >10 measuring points per period of the periodic signal 16 which is modulated on. As a result, a dimensionally accurate signal reconstruction can be achieved. In addition, the adjustment device 12 has a computing unit 36 which is provided to determine, from a correlation between the periodic signal 16 and a variation of the state characteristic variable 18, a pre-commutation angle 14 which is adapted to a current operating state of the electric motor 10.

In order to automatically adjust the pre-commutation angle 14 during the operation of the electric motor 10, the periodic signal 16 which is generated by the signal generator unit 32 is modulated onto the current pre-commutation angle 14 during the operation of the electric motor 10. In addition, during the operation of the electric motor 10 a state characteristic variable 18 of the electric motor 10 which correlates with an efficiency level of the electric motor 10, preferably a current signal of a current consumption level of the electric motor 10, is acquired by means of the sensor unit 34. In a method step, the acquired state characteristic variable 18 is multiplied by the periodic signal 16 and the periodic signal 20 which is also generated by the signal generator unit 32 and is phase-shifted through 90°. For this purpose, the computing unit 36 has two multipliers 40, 42. A first multiplier 40 is provided to multiply the state characteristic variable 18 by the periodic signal 16. The second multiplier 42 is provided to multiply the state characteristic variable 18 by the periodic signal 20 which is phase-shifted through 90°.

In a further method step, in each case integration 22 of the products 48, 50 of the multiplications of the state characteristic variable 18 by the periodic signal 16 and the periodic signal 20 which is phase-shifted through 90° is carried out. For this purpose, the computing unit 36 has two integrators 44, 46. A first integrator 44 is provided to integrate the product 48 of the multiplication of the state characteristic variable 18 by the periodic signal 16. The second integrator 46 is provided to integrate the product 50 of the multiplication of the state characteristic variable 18 by the periodic signal 20 which is phase-shifted through 90°.

In a further method step, division 24 of the integration results is carried out, and the arc-tangent function 26 of the quotient is calculated. The angle 28 which is determined in this way can be used directly as an adjustment signal for an adjuster 52 which is embodied, in particular, as a PI controller. The angle 28 which is calculated in this way is used as a pre-commutation angle 14 which is adapted to a current operating state of the electric motor 10. In particular, the pre-commutation angle 14 can be determined continuously or at predefined time intervals during operation of the electric motor 10. In this way it is possible that the pre-commutation angle 14 which is the optimum one of the current operating point is determined and set. Alternatively or additionally there can be provision that the pre-commutation angle 14 is newly determined only when the operating point changes.

The invention claimed is:

1. A method for operating an electronically commutated electric motor (10), the method comprising:
adjusting a pre-commutation angle during ongoing operation of the electric motor (10) to achieve an optimum operating point of the electric motor (10), wherein the pre-commutation angle (14) provided by an adjustment device (12), wherein during operation of the electric motor (10) a periodic signal (16) is modulated onto the pre-commutation angle (14) and a state characteristic variable (18) of the electric motor (10), correlating with an efficiency level of the electric motor (10), is acquired, wherein the state characteristic variable (18) is multiplied by the periodic signal (16).

2. The method as claimed in claim 1, further comprising multiplying the state characteristic variable (18) by the periodic signal (20) which is phase-shifted through 90°.

3. The method as claimed in claim 2, further comprising integrating (22) the products (48, 50) of the multiplications of the state characteristic variable (18) with the periodic signal (16) and with the periodic signal (20) which is phase-shifted through 90°.

4. The method as claimed in claim 3, further comprising dividing (24) the integration results, and calculating an arc-tangent function (26).

5. The method as claimed in claim 3, further comprising using a calculated angle (28) as a pre-commutation angle (14) which is adapted to a current operating state of the electric motor (10).

6. An adjustment device comprising;
at least one adjustment unit (30) which is configured to adjust a pre-commutation angle (14) in order to achieve an optimum operating point of an electric motor (10) during an ongoing operation of the electric motor (10);
at least one signal generator unit (32) for modulating a periodic signal (16) onto the pre-commutation angle (14) during operation of the electric motor (10);
at least one sensor unit (34) configured to acquire a state characteristic variable (18) of the electric motor (10), which correlates with an efficiency level of the electric motor (10); and
a computing unit (36) configured to determine, from a correlation between the periodic signal (16) and a variation in the state characteristic variable (18), the pre-commutation angle (14),
wherein the state characteristic variable (18) is multiplied by the periodic signal (16).

* * * * *